United States Patent
Jeun et al.

(10) Patent No.: US 7,447,007 B2
(45) Date of Patent: Nov. 4, 2008

(54) PORTABLE COMPUTER

(75) Inventors: Sung-Kyu Jeun, Suwon-si (KR); Bum-Young Won, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 259 days.

(21) Appl. No.: 11/229,661

(22) Filed: Sep. 20, 2005

(65) Prior Publication Data

US 2006/0071916 A1    Apr. 6, 2006

(30) Foreign Application Priority Data

Oct. 6, 2004    (KR)    .................... 10-2004-0079708

(51) Int. Cl.
   *G06F 1/16*    (2006.01)
(52) U.S. Cl. ..................... 361/683; 439/31; 361/724
(58) Field of Classification Search ................. 345/168; 16/239, 221, 342; 248/176.1, 917; 361/679–687, 361/724–727; 439/31
See application file for complete search history.

(56) References Cited

U.S. PATENT DOCUMENTS 6,530,784 B1 * 3/2003 Yim et al. ..................... 439/31

| | | | |
|---|---|---|---|
| 2003/0072132 A1 * | 4/2003 | Liu et al. | 361/683 |
| 2004/0244146 A1 * | 12/2004 | Park | 16/239 |
| 2005/0036281 A1 * | 2/2005 | Duncan | 361/683 |
| 2005/0057516 A1 * | 3/2005 | Ghosh et al. | 345/168 |
| 2005/0178933 A1 * | 8/2005 | Yoo | 248/176.1 |

FOREIGN PATENT DOCUMENTS

| KR | 1999-0035864 | 9/1999 |
|---|---|---|
| KR | 2001-0027536 | 4/2001 |
| KR | 20-0239035 | 7/2001 |
| KR | 2003-0082913 | 10/2003 |

\* cited by examiner

*Primary Examiner*—Hung V Duong
(74) *Attorney, Agent, or Firm*—Roylance, Abrams, Berdo & Goodman, LLP (57) ABSTRACT

The present invention relates to a portable computer having a computer main body and a display part coupled to the computer main body. The portable computer comprises a connector provided in the computer main body and detachably combining the display part to the computer main body, and a supporting device having a display support supporting the display part and rotatably coupled to the computer main body, and a connection unit provided in the computer main body and transmitting rotation of the display support to rotation of the connector. Thus, the present invention provides a portable computer capable of safely and stably coupling the display part with the computer main body detachably and rotatably.

7 Claims, 6 Drawing Sheets

PORTABLE COMPUTER

CROSS-REFERENCE TO RELATED APPLICATION

This application claims the benefit under 35 U.S.C. §119(a) of Korean Patent Application No. 2004-0079708, filed on Oct. 6, 2004, in the Korean Intellectual Property Office, the entire disclosure of which is hereby incorporated by reference.

BACKGROUND OF THE INVENTION

1. Field of the Invention

The present invention relates to a portable computer. More particularly, the present invention relates to a portable computer having an improved support structure for detachably supporting a display part on a computer main body.

2. Description of the Related Art

Throughout the specification, the term portable computer should be understood to comprise all types of portable computers such as, but not limited to, a laptop computer, a notebook computer and a palmtop computer.

Such a portable computer comprises a computer main body including a central processing unit (CPU) and a graphic chip; and a display part for displaying a video signal received from the computer main body on a screen. The display part comprises a flat display panel such as a liquid crystal display (LCD), in general.

As an example of the portable computer, Korean Patent Laid-open Publication No. 2001-0027536 which is incorporated herein by reference, discloses a display assembly structure for an electronic appliance. Such a display assembling structure for detachably combining a display part to a computer main body comprises a hinge pin rotatably provided in the computer main body, a mounting part including a housing placed in the display part for rotating with the hinge pin by being coupled to the hinge pin, and an optical connector placed in correspondence with each of the computer main body and the display part for transmitting a video signal.

Thus, in the conventional electronic appliances, the display part can be attached and detached to and from the computer main body, and when one of the computer main body and the display part has a failure or the life span thereof ends, it can be replaced.

However, in the conventional portable computer, the hinge pin may be overloaded since the mounting part is supported by being connected to the hinge pin for detachably rotating the display part around the computer main body. Accordingly, a need exists for an improved supporting device capable of safely and stably coupling the display part with the computer main body detachably and rotatably.

SUMMARY OF THE INVENTION

Accordingly, an aspect of the present invention is to provide a portable computer capable of safely and stably coupling the display part with the computer main body detachably and rotatably.

Additional aspects and/or advantages of the present invention will be illustrated in part in the description which follows and, in part, will be obvious from the description, or may be learned by practice of the present invention.

The foregoing and other aspects of the present invention are achieved by providing a portable computer having a computer main body and a display part coupled to the computer main body. The portable computer comprises a connector provided in the computer main body for detachably combining the display part to the computer main body; and a supporting device comprising a display support for supporting the display part and rotatably coupled to the computer main body; and a connection unit provided in the computer main body for transmitting rotation of the display support to rotation of the connector.

According to another aspect of the present invention, a rotation axis of the connector is different from a rotation axis of the display support.

According to another aspect of the present invention, the connection unit comprises a first rotatable body provided for rotating with the display support and a second rotatable body provided for rotating with the connector and connected with the first rotatable body for rotating in the same direction as the first rotatable body.

According to another aspect of the present invention, the connection unit further comprises a support bracket provided in the computer main body for rotatably supporting the display support and the first rotatable body; and a connector bracket provided in the computer main body for rotatably supporting the connector and the second rotatable body.

According to another aspect of the present invention, each of the first rotatable body and the second rotatable body is provided as a gear, and the connection unit further comprises a rack engageably coupled to the first rotatable body and the second rotatable body.

According to another aspect of the present invention, each of the first rotatable body and the second rotatable body is provided as a gear, and the connection unit further comprises an idle gear engageably coupled between the first rotatable body and the second rotatable body.

According to another aspect of the present invention, the connection unit further comprises a belt coupled to the first rotatable body and the second rotatable body.

According to another aspect of the present invention, the computer main body comprises stoppers to prevent the display part from sliding forward when the display part is coupled to the computer main body.

According to another aspect of the present invention, the display part comprises a support coupling part to couple with the display support.

According to another aspect of the present invention, the display part comprises a touch screen.

BRIEF DESCRIPTION OF THE DRAWINGS

The above and/or other aspects and advantages of the present invention will become apparent and more readily appreciated from the following description of exemplary embodiments, taken in conjunction with the accompanying drawings of which.

Throughout the drawings, it should be noted that like reference numbers are used to depict the same or similar elements, features and structures.

DETAILED DESCRIPTION OF EXEMPLARY EMBODIMENTS

Reference will now be made in detail to exemplary embodiments of the present invention, examples of which are illustrated in the accompanying drawings.

As shown in FIGS. 1 through 4, a portable computer 1 according to an exemplary embodiment of the present invention comprises a computer main body 10, a display part 20 coupled to the computer main body 10, a connector 19 placed in the computer main body 10 for detachably combining the display part 20 to the computer main body 10, and a supporting device 30 for supporting the display part 20 for rotating the connector 19 corresponding to the rotation of the display part 20.

Figure 1:
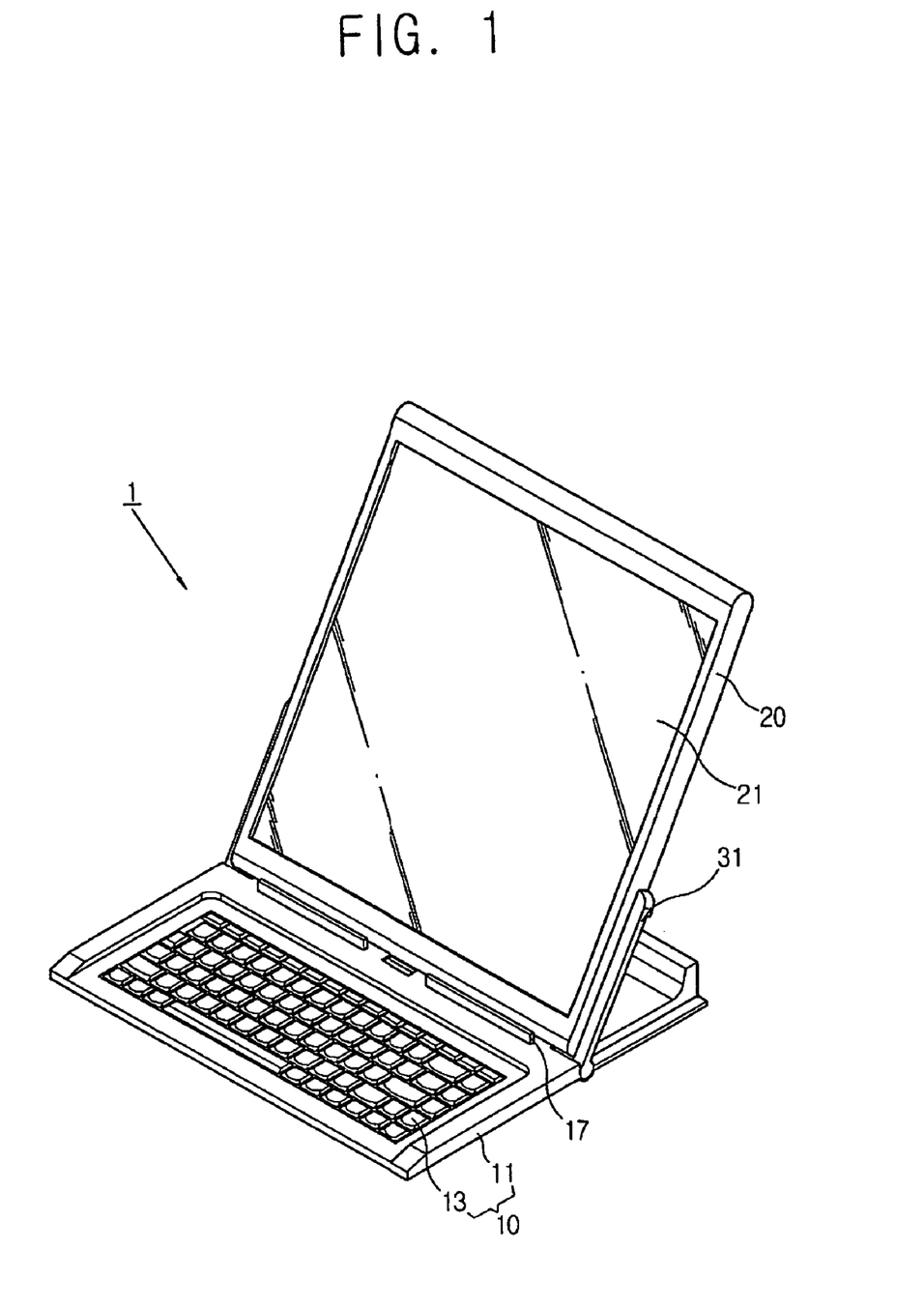
FIG. 1 is a perspective view of a portable computer according to an exemplary embodiment of the present invention.
Figure 2:
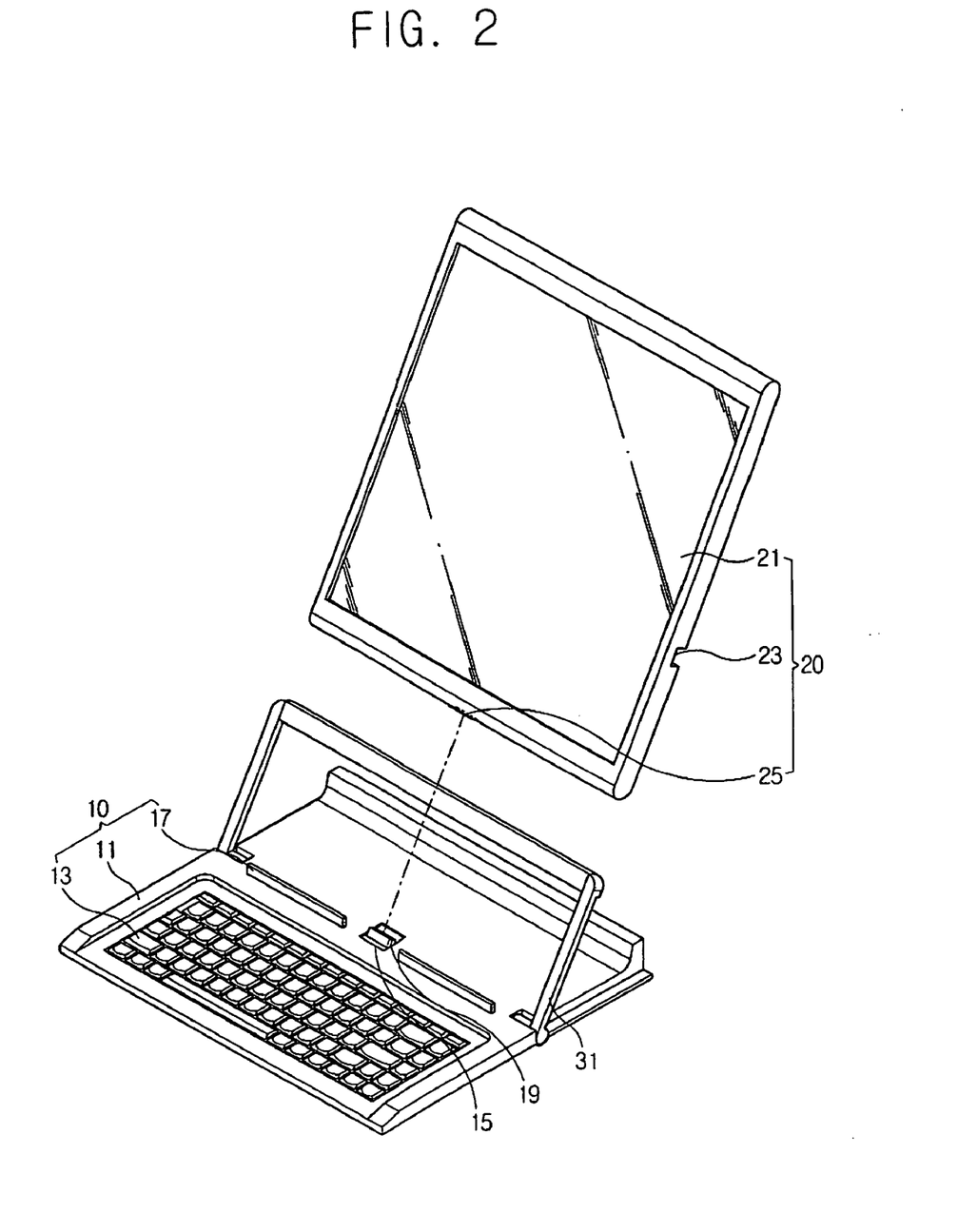
FIG. 2 is a perspective view of the portable computer according to FIG. 1 according to an exemplary embodiment of the present invention, wherein the display part is separated from the portable computer.

The computer main body 10 comprises a main body casing 11 for forming an external appearance, and a keyboard 13 placed at an upper part of the main body casing 11 to input data.

In the main body casing 11 electronic components (not shown) such as a central processing unit and a graphic chip are mounted thereon. On an upper central part of the main body casing 11 a connector through part 15 to couple the connector 19 with the display part 20 is formed. Stoppers 17 may be placed in opposite side of the main body casing 11 in order to prevent the display part 20 from sliding toward the keyboard 13 placed in front thereof when the display part 20 is coupled to the connector 19.

Though the connector through part 15 is exposed to the connector 19, the connector through part 15 has a suitable size that the connector is not interfered with when it rotatably moves with a display support 31 of the supporting device 30 described in greater detail below. The connector through part 15 preferably has a rectangular shape in an exemplary embodiment, but also may have circular or other polygonal shapes to expose the connector 19.

At least one of the stoppers 17 protrudes from an upper surface of the main body casing 11 for contacting with a front lower part of the display part 20 when the display part 20 is coupled to the computer main body 10. However, the stoppers 17 may be provided as grooves at the upper surface of the main body casing 11 to accommodate the front lower part of the display part 20 when the display part 20 is coupled to the computer main body 10.

By preventing the display part 20 from sliding forward due to the stoppers 17 when coupling with the connector 19 of the computer main body 10, a user can more safely and easily connect the display part 20 to the computer main body 10.

The display part 20 comprises a screen 21 for forming a picture and a connector coupling part 25 provided to be detachably coupled to the connector 19 of the computer main body 10. A flat display panel such as a liquid crystal display (LCD) or a plasma display panel (PDP) can be used for the display part 20. The display part 20 is desirable but not necessary to be provided as a touch screen that a user touches with a hand or a stylus pen. Thus, a user can select or perform a tablet function by directly touching the screen 21. In the display part 20 a power supply (not shown) to operate the display part 20 is provided, even when the display part 20 is detached from the computer main body 10. The power supply may have a battery or a connection port for connecting to an external power. A support coupling part 23 is placed in the display part 20 to couple with a display support 31 of the supporting device 30 to be described later.

The connector coupling part 25 is placed at a lower part of the display part 20 to accommodate the connector 19 placed in the computer main body 10. However, the connector coupling part 25 may be inserted into the connector 19. By coupling the connector coupling part 25 to the connector 19, the display part 20 may receive a video signal, power supply and the like, and the signal input from the touch screen may be transferred to the computer main body 10.

The support coupling part 23 is formed on a back of the display part 20 in correspondence with the display support 31 for preventing the display part 20 from randomly sliding and being detached from the display support 31, when the display support 31 of the supporting device 30 supports the display part 20. The support coupling part 23 is formed as a groove behind the display part 20 for accommodating at least a portion of the display support 31 of the supporting device 30 in an exemplary embodiment. Alternatively, the support coupling part 23 may be provided as various forms such as a hook and the like behind the display part 20 for engaging with at least a portion of the display support 31 of the supporting device 30.

The connector 19 is rotatably coupled to the computer main body 10. A portion of the connector 19 penetrates the connector through part 15 of the main body casing 11, and is exposed to the outside. The connector 19 is rotatably provided by the supporting device 30. That is, the connector 19 moves rotatably with the display support 31 of the supporting device 30 to be described later. Thus, the connector 19 may rotate corresponding to the rotation of the display part 20.

Figure 3:
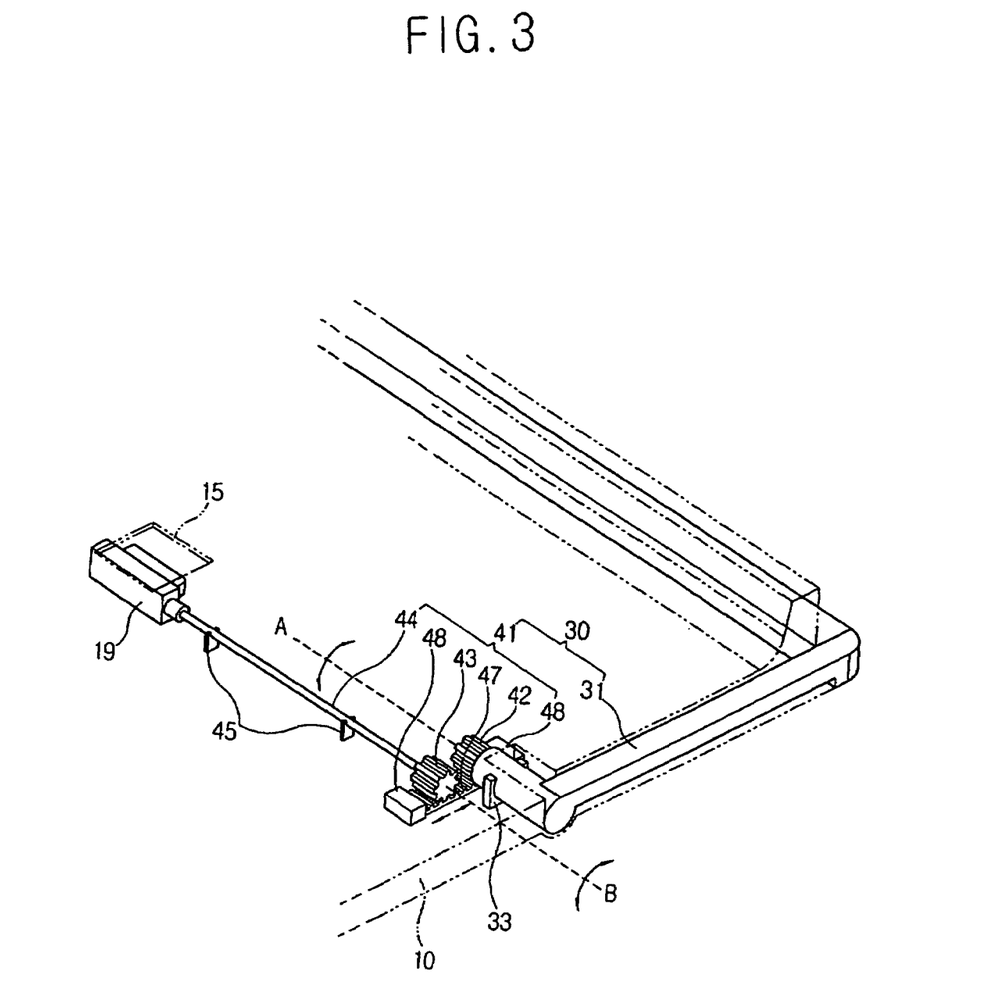
FIG. 3 is a partial perspective view illustrating a supporting device of the portable computer according to an exemplary embodiment of the present invention.

The supporting device 30 comprises the display support 31 for supporting the display part 20 and rotatably coupled to the computer main body 10, and a connection unit 41 provided in the computer main body 10 for transmitting rotation of the display support 31 to rotation of the connector 19. The supporting device 30 transmits the rotation of the display support 31 to the rotation of the connector 19 when a rotation axis A of the display support 31 is different from a rotation axis B of the connector 19. However, the supporting device 30 may transmit the rotation of the display support 31 to the rotation of the connector 19 even when the rotation axis A of the display support 31 is the same as the rotation axis B of the connector 19. That is, when the rotation axis A of the display support 31 is the same as the rotation axis B of the connector 19, the display support 31 and the connector 19 rotate integrally as a shaft of the display support 31 and a shaft of the connector 19 are integrally coupled.

A first side of the display support 31 supports the display part 20, and a second side thereof is rotatably coupled to the computer main body 10. The first side of the display support 31 is provided to be coupled to the support coupling part 23 of the display part 20, and the second side thereof is rotatably coupled to the support coupling part 23 of the connection unit 41 to be described later. The display support 31 requires coupling with the support coupling part 23 to generate friction force therebetween so that the display support 31 should support the weight of the display part 20 at a predetermined angle and maintain the angle. Preferably, the rotation axis A of the display support 31 and the rotation axis B of the connector 19 are differently provided so as to stably support the weight of the display part 20 at the predetermined angle in correspondence with the display part 20 getting heavier because of increase in size. That is, by placing the rotation axis A of the display support 31 behind the rotation axis B of the connector 19 in the computer main body 10, the display support 31 can more stably support the weight of the display part 20, and have relatively small friction force when coupling with the support coupling part 23 as compared with when the rotation axis A of the display support 31 is in the same position as the rotation axis B of the connector 19. Also, the manufacturing process can be simplified. The display support 31 is provided as a shape of "⌐", and opposite end thereof is rotatably coupled to the computer main body 10. A central portion of the display support 31 supports a back surface of the display part 20. However, the display support 31 is not limited to the shape of "⌐", and may be provided as various shapes to be rotatably coupled to the computer main body 10 and support the display part 20.

The connection unit 41 supports the connector 19 and the display support 31 having different rotation axes respectively, and transmits the rotation of the display support 31 to the rotation of the connector 19. The connection unit 41 comprises a first rotatable body 42 provided for rotating integrally with the display part 20, and a second rotatable body 42 provided for rotating integrally with the connector 19 and connected to the first rotatable body 42 for rotating in the same direction as the first rotatable body 42. The connection unit 41 may further comprise a support bracket 33 placed in the computer main body 10 for rotatably supporting the display support 31 and the first rotatable body 42; and a connector bracket 45 placed in the computer main body 10 for rotatably supporting the connector 19 and the second rotatable body 43. The connection unit 41 may further comprise a connection rod 44 shaped like a long bar for connecting the connector 19 to the second rotatable body 43 so as to rotate the connector 19 and the second rotatable body 43 integrally. As in an exemplary embodiment of the present invention shown in FIGS. 3 and 4, the connection unit 41 may further comprise a rack 47 engageably coupled to the first rotatable body 42 and the second rotatable body 43.

The first rotatable body 42 is integrally and rotatably provided as a cylinder at an end part of the display support 31, and on a surface thereof a gear is formed. The first rotatable body 42 is rotatably supported by the support bracket 33 and rotates around the rotation axis A thereof. Thus, the first rotatable body 42 is engageably coupled to the rack 47, and moves the rack 47 forward and backward. However, the first rotatable body 42 is not limited to the gear, and may comprise such a mechanism that rotates the second rotatable body 43 by friction force, or the like.

The second rotatable body 43 is integrally and rotatably provided as a cylinder at an end part of the connection rod 44 and a gear is formed on a surface thereof. The second rotatable body 43 is rotatably supported by the connector bracket 45 and rotates around the rotation axis B thereof. However, the second rotatable body 43 is not limited to the gear, and may be provided as various types of mechanisms corresponding to the first rotatable body 42.

The support bracket 33 is integrally provided in the computer main body 10, and rotatably coupled to the display support 31 for rotatably supporting the display support 31 and the first rotatable body 42. The support bracket 33 is rotatably coupled to the display support 31 for generating friction force when the display support 31 rotates. Such friction force may prevent the display support 31 from rotating randomly by the weight thereof or the display part 20. Thus, a user should apply pressure to overcome such friction force in rotating the display support 31. The display support 31 may be forcibly inserted into the support bracket 33 for generating the friction force, or a leaf spring (not shown) may be provided between the display support 31 and the support bracket 33 for generating the friction force.

The connector brackets 45 are integrally provided in the computer main body 10, and rotatably coupled to rotatably support the connector 19 and the second rotatable body 43. Preferably, the conneceter brackets 45 are provided as a plurality of brackets. Also, the connector brackets 45 are preferably coupled with the connection rod 44 so that the connector 19 and the second rotatable body 43 can be randomly rotated by the first rotatable body 42.

The rack 47 is engaged with both the first rotatable body 42 and the second rotatable body 43 to be moved by the first rotatable body 42 and the second rotatable body 43 for thereby transmitting the rotation of the first rotatable body 42 to the rotation of the second rotatable body 43. The rack 47 is guided by rack guides 48. When the first rotatable body 42 and the second rotatable body 42 are not provided as the gear, the rack 47 transmits the rotation of the first rotatable body 42 to the rotation of the second rotatable body 43 by friction force, instead of being engaged by the gear.

The rack guides 48 are provided as a pair to accommodate opposite ends of the rack 47, and integrally coupled to the computer main body 10.

With this configuration, the operation process of the portable computer 1 according to an exemplary embodiment of the present invention is as follows.

Figure 4:
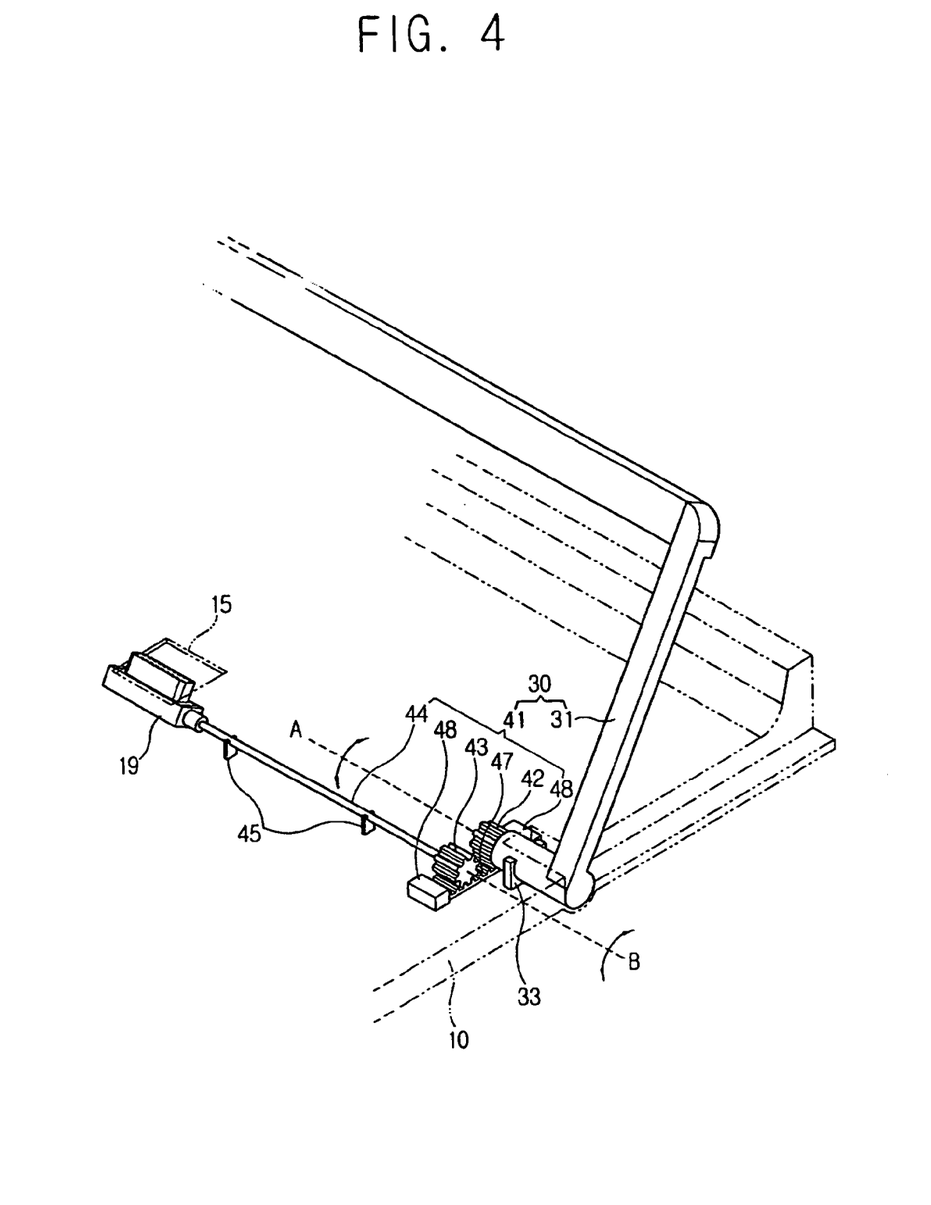
FIG. 4 a partial perspective view illustrating an operation of the supporting device of the portable computer in FIG. 3 according to an exemplary embodiment of the present invention.

First, as shown in FIG. 3, the display support 31 rotates as shown in FIG. 4 from being folded in parallel with the computer main body 10. Then, the first rotatable body 42 rotates integrally with the display support 31, and the rack 47 moves backward by the rotation of the first rotatable body 42. Also, the second rotatable body 43 rotates the connector 19 by the rotation of the rack 47. Then, the connector coupling part 25 of the display part 20 is coupled to the connector 19, and at the same time, the support coupling part 23 of the display part 20 reaches the display support 31. Also, the lower part of the display part 20 is blocked by the stoppers 17. Then, the coupling process of the display part 20 is completed. Then, a user can press the display part 20 or the display support 31 with predetermined force to rotate the display support 31 for thereby adjusting the viewing angle of the display part 20.

The detailed description about the process for detaching the display part 20 from the computer main body 10 will be omitted since the process thereof is reverse from the coupling process.

The portable computer according to an exemplary embodiment of the present invention comprises the display support for supporting the display part and rotatably coupled to the computer main body; and the supporting device placed in the computer main body including the connection unit for transmitting the rotation of the display support to the rotation of the connector. Hence, the display part may detachably rotate around the computer main body more safely and stably. By providing the rotation axis of the display support and the rotation axis of the connector differently from each other, the display support can support the display part more safely.

Figure 5:
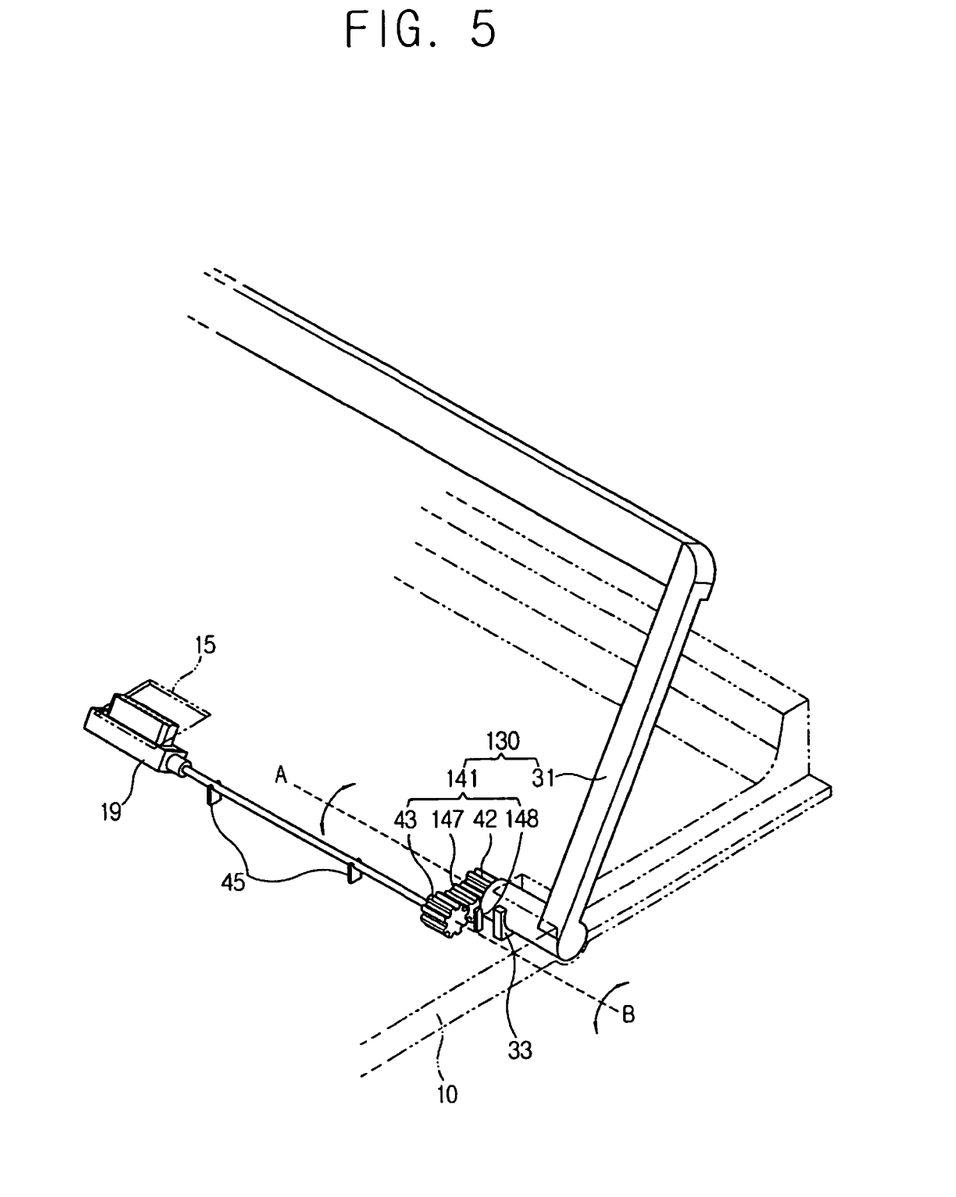
FIG. 5 is a partial perspective view illustrating the supporting device of the portable computer according to an exemplary embodiment of the present invention.

FIG. 5 is a partial perspective view of the supporting device of the portable computer according to another exemplary embodiment of the present invention. According to an exemplary embodiment of present invention, an idle gear 147 is provided by being engageably coupled between the first rotatable body 42 and the second rotatable body 43 in the connection unit 141 of the supporting device 130.

The idle gear 147 is placed between the first rotatable body 42 and the second rotatable body 43 for transmitting the rotation from the first rotatable body 42 to the second rotatable body 43. The idle gear 147 is rotatably coupled to the computer main body 10 by a gear support 148.

The gear support 148 is integrally coupled to the computer main body 10 for rotatably supporting the idle gear 147.

Thus, the portable computer according to an embodiment of the present invention comprises the display support for supporting the display part and rotatably coupled to the computer main body, the supporting device placed in the computer main body and comprising the connection unit for transmitting the rotation of the display support to the rotation of the connector, and the idle gear engageably coupled between the first rotatable body and the second rotatable body provided in the connection unit for thereby detachably rotating the display part around the computer main body more safely and stably.

Figure 6:
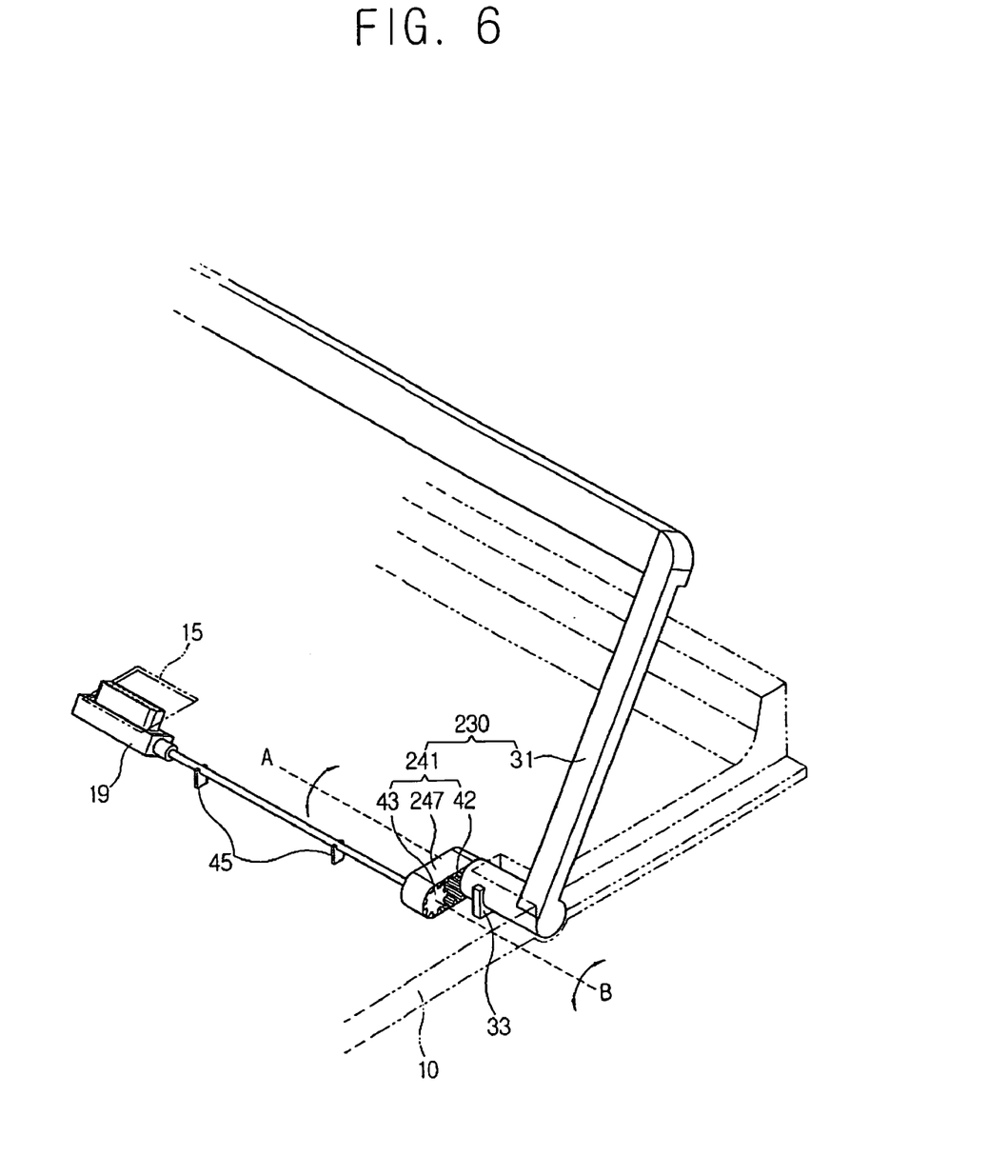
FIG. 6 is a partial perspective view of the supporting device of the portable computer according to an exemplary embodiment of the present invention.

FIG. 6 is a partial perspective view of the supporting device of the portable computer according to yet another exemplary embodiment of the present invention. According to an exemplary embodiment of present invention, a belt 247 is coupled to the first rotatable body 42 and the second rotatable body 43 in the connection unit 241 of a supporting device 230.

The belt 247 is coupled to the first rotatable body 42 and the second rotatable body 43 and transmits the rotation of the first rotatable body 42 to the rotation of the second rotatable body 43. The belt 247 may be provided as a timing belt corresponding to the gear of the first rotatable body 42 and the second rotatable body 43. However, the belt may be also provided as a V-belt or the like when the first rotatable body 42 and the second rotatable body 43 are provided as a pulley.

Thus, the portable computer according to an exemplary embodiment of the present invention comprises the display support for supporting the display part and rotatably coupled to the computer main body; the supporting device placed in the computer main body including the connection unit for transmitting the rotation of the display support to the rotation of the connector; and the belt coupled to the first rotatable body and the second rotatable body provided in the connection unit for thereby detachably rotating the display part around the computer main body more safely and stably.

Although exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A portable computer having a computer main body and a display part coupled to the computer main body, the portable computer comprising:
a connector provided in the computer main body for detachably combining the display part to the computer main body; and
a supporting device comprising a display support for supporting the display part and rotatably coupled to the computer main body, and a connection unit provided in the computer main body for transmitting rotation of the display support relative to the computer main body to rotation of the connector relative to the computer main body,
wherein a rotation axis of the connector is different from a rotation axis of the display part.

2. The portable computer according to claim 1, wherein the connection unit comprises a first rotatable body provided to rotate with the display support; and a second rotatable body provided to rotate with the connector and connected with the first rotatable body to rotate in the same direction as the first rotatable body.

3. The portable computer according to claim 2, wherein the connection unit further comprises a support bracket provided in the computer main body for rotatably supporting the display support and the first rotatable body; and a connector bracket provided in the computer main body for rotatably supporting the connector and the second rotatable body.

4. The portable computer according to claim 3, wherein each of the first rotatable body and the second rotatable body is provided as a gear, and the connection unit further comprises a rack engageably coupled to the first rotatable body and the second rotatable body.

5. The portable computer according to claim 3, wherein each of the first rotatable body and the second rotatable body is provided as a gear, and the connection unit further comprises an idle gear engageably coupled between the first rotatable body and the second rotatable body.

6. The portable computer according to claim 3, wherein the connection unit further comprises a belt coupled to the first rotatable body and the second rotatable body.

7. A portable computer having a computer main body and a display part coupled to the computer main body, the portable computer comprising:
a connector provided in the computer main body for detachably combining the display part to the computer main body; and
a supporting device comprising a display support for supporting the display part and rotatably coupled to the computer main body, and a connection unit provided in the computer main body for transmitting rotation of the display support relative to the computer main body to rotation of the connector relative to the computer main body,
wherein the computer main body comprises stoppers for preventing the display part from sliding forward when the display part is coupled to the computer main body.

* * * * *